United States Patent
Muhonen (10) Patent No.: US 8,731,515 B2
(45) Date of Patent: May 20, 2014

(54) METHOD AND SYSTEM FOR ESTABLISHING AN EMERGENCY CALL IN A COMMUNICATIONS SYSTEM

(75) Inventor: Janne Markus Muhonen, Helsinki (FI)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 0 days.

(21) Appl. No.: 10/550,074

(22) PCT Filed: Mar. 23, 2004

(86) PCT No.: PCT/IB2004/001360
§ 371 (c)(1),
(2), (4) Date: Dec. 5, 2005

(87) PCT Pub. No.: WO2004/086772
PCT Pub. Date: Jul. 10, 2004

(65) Prior Publication Data
US 2007/0004378 A1 Jan. 4, 2007

(30) Foreign Application Priority Data
Mar. 24, 2003 (GB) .................................. 0306711.3

(51) Int. Cl.
*H04M 11/04* (2006.01)

(52) U.S. Cl.
USPC .................. 455/404.2; 455/422.1; 455/432.1; 455/445; 455/456.1; 379/40; 379/45; 379/49; 379/50; 340/286.06; 340/989; 342/450; 370/338

(58) Field of Classification Search
USPC ............. 455/404.1–404.2, 445, 456.1–456.4, 455/422.1, 433, 461; 379/37–51; 370/328–338; 340/287–309, 988–996; 342/450–465
See application file for complete search history.

(56) References Cited

U.S. PATENT DOCUMENTS

| | | | | |
|---|---|---|---|---|
| 5,797,093 | A * | 8/1998 | Houde ....................... | 455/404.1 |
| 6,128,481 | A * | 10/2000 | Houde et al. ............... | 455/404.2 |
| 6,167,266 | A | 12/2000 | Havinis et al. ............... | 455/433 |
| 6,256,489 | B1 * | 7/2001 | Lichter et al. .............. | 455/404.2 |
| 6,469,665 | B2 * | 10/2002 | Porcino ........................ | 342/387 |
| 6,782,264 | B2 * | 8/2004 | Anderson ................... | 455/456.1 |
| 2002/0057764 | A1 * | 5/2002 | Salvucci et al. ................. | 379/37 |
| 2003/0063714 | A1 * | 4/2003 | Stumer et al. .................... | 379/37 |
| 2003/0186709 | A1 * | 10/2003 | Rhodes et al. ............. | 455/456.1 |
| 2004/0033795 | A1 * | 2/2004 | Walsh et al. ............... | 455/404.1 |
| 2004/0102196 | A1 * | 5/2004 | Weckstrom et al. ........ | 455/456.1 |
| 2004/0259566 | A1 * | 12/2004 | Maanoja et al. ........... | 455/456.1 |

FOREIGN PATENT DOCUMENTS

| WO | WO 9800988 | * | 1/1998 |
|---|---|---|---|
| WO | WO 99/27716 | | 6/1999 |
| WO | WO 9927716 | * | 6/1999 |

OTHER PUBLICATIONS

European Office action for corresponding EP application No. 04 722 611.3-2220 dated Apr. 27, 2011, pp. 1-6.

* cited by examiner

*Primary Examiner* — Quan M Hua (57) ABSTRACT

A method for establishing an emergency call between a user equipment within a radio coverage area and one of at least two points able to answer the call, the method comprising: receiving said emergency call request; determining a first estimate of the position of said user equipment within said coverage area; interrupting said call establishment by triggering a control point; and using the control point to select, based on said first position estimate, which one of said at least two answering points the call is established with.

10 Claims, 7 Drawing Sheets

METHOD AND SYSTEM FOR ESTABLISHING AN EMERGENCY CALL IN A COMMUNICATIONS SYSTEM

FIELD OF THE INVENTION

The present invention relates to a method and system for locating user equipment within a communications network.

BACKGROUND OF THE INVENTION

A cellular telecommunications system is a communication system that is based on use of radio access entities and/or wireless service areas. The access entities operate over respective coverage areas that are typically referred to as cells. Examples of cellular telecommunications systems include standards such as the GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access), TDMA/CDMA (Time Division Multiple Access/Code Division Multiple Access) in UMTS (Universal Mobile Telecommunications System), CDMA 2000, i-Phone and so on.

In a cellular system, a base transceiver station (BTS) provides a wireless communication facility that serves mobile stations (MS) or similar wireless user equipment (UE) via an air or radio interface within the coverage area of the cell. As the approximate size and the shape of the cell is known, it is possible to associate the cell to a geographical area. Each of the cells can be controlled by an appropriate controller apparatus.

Elements of the cellular network can be employed for provision of location information concerning a mobile station and the user thereof. More particularly, the cells or similar geographically limited service areas facilitate the cellular telecommunications system to produce at least a rough location information estimate concerning the current geographical location of a mobile station, as the cellular telecommunications system is aware of the cell with which a mobile station currently associates. Therefore it is possible to conclude from the location of the cell the geographical area in which the mobile station is likely to be at a given moment. This information is available also when the mobile station is located within the coverage area of a visited or "foreign" network. The visited network may be capable of transmitting location information of the mobile station back to the home network, e.g. to support location services or for the purposes of call routing and charging.

A location service feature may be provided by a separate network element such as a location server which receives location information from at least one of the controllers of the system. If no further computations and/or approximations are made, this would give the location to an accuracy of one cell, i.e. it would indicate that the mobile station is (or at least was) within the coverage area of a certain cell.

However, the accuracy of the location determination may be improved by utilising results of measurements which define the travel time (or travel time differences) of the radio signal sent by a mobile station to the base station. More accurate location information may be obtained through e.g. by calculating the geographical location from range or range difference (RD) measurements. All methods that use range difference (RD) measurements may also be called TDOA (time difference of arrival) methods (mathematically RD=c*TDOA, wherein c is the signal propagation speed). Observed time difference (OTD), E-OTD (Enhanced OTD) and TOA (time of arrival) are mentioned herein as examples of technologies that are based on the RD measurements.

The difference between the TOA (time of arrival) and the E-OTD is in that in the TOA the mobile station sends the signal and network makes the measurements, whereas in the E-OTD the network sends the signals and the mobile station measures them. The mobile stations are provided with appropriate equipment and software to provide information on which the positioning of the mobile station can be based on. The mobile station may communicate the information via the base station to an appropriate network element that may use the information in a predefined manner.

It is also possible to form RD measurements based on other sources, e.g. from GPS (Global Positioning System) pseudorange measurements.

Therefore it is evident that there exist a variety of techniques for determining the position of the mobile station within a cell. In many of these systems, for example TDOA, the position measurement signals are received by LMUs (Location Measuring Units) from the MS and then sent to a SMLC (Serving Mobile Location Centre) that calculates the location of the MS.

Accurate positioning information is particularly required for emergency services, so that an emergency service provider is able to determine an accurate estimate of the current location of a MS.

The United States Federal Communication Commission (FCC) has mandated that wireless service providers have to implement location technologies that can locate wireless phone users who are calling to emergency numbers. In particular, the FCC's Third Report and Order (FCC 99-245) specifies the following standards for Phase II location accuracy and reliability:

For network based solutions:—100 meters for 67% of calls, and 300 meters for 95% of calls;
For handset based solutions:—50 meters for 67% of calls, and 150 meters for 95% of calls.

The ANSI (American National Standards Institute) specification TIA/EIA/J-STD-036-A having the title "Enhanced Wireless 9-1-1 Phase 2" defines for ANSI 41 and GSM systems how initial and updated location information is determined and routed to a PSAP (Public Safety Answering Point) during an emergency call. However, this routing is based on cell level location information, wherein a MSC (Mobile Switching Centre) routes all emergency calls from certain cells to a particular PSAP.

However, this solution is not optimised in situations in which there are two or more PSAP service areas that over lap with the coverage of a single cell, and the problem becomes even more acute when the cells are setup to have large coverage areas.

The present invention is related to allowing emergency calls to be routed based on geographical position within a cell.

Therefore there is a need for an improved manner of routing emergency calls based on the geographical location.

SUMMARY OF THE INVENTION

It is an aim of embodiments of the present invention to address one or more of these problems using existing functionality.

According to one aspect there is provided a method for establishing an emergency call between a user equipment within a radio coverage area and one of at least two points able to answer the call, the method comprising: receiving said emergency call request; determining a first estimate of the position of said user equipment within said coverage area;

interrupting said call establishment by triggering a control point; and using the control point to select, based on said first position estimate, which one of said at least two answering points the call is established with.

Preferably said at least one answering point has been selected, said switching centre resumes said call establishment and a second more accurate position estimate is determined and sent to said selected answering point.

Preferably non-call associated signalling is used wherein messages used to select the at least one of the two answering points during call establishment are separate from the messages used for the established call itself.

Preferably said selecting is done using the control point for translating the first position estimate which is a geographical position into a routing number of the selected answering point.

Preferably the first position estimate is determined by using an identifier of said radio coverage area and timing advance information.

According to a second aspect of the invention there is provided a communications system for establishing an emergency call between a user equipment and an emergency call processing centre, the system being configured to establish the call according to a method as set out above.

According to a third aspect of the invention there is provided a communications network for establishing an emergency call between a user equipment within a radio coverage area and one of at least two points able to answer the call, the network comprising: a base controller for controlling a base transceiver that provides said radio coverage area; a switching centre for receiving said emergency call request; a location centre for determining a first estimate of the position of said user equipment within said coverage area; and a control point for selecting which of said at least two answering points the call is established with based on said first position estimate and wherein the control point is triggered by interrupting said call establishment.

Preferably when said at least one answering point has been selected, said switching centre resumes said call establishment and a second more accurate position estimate is determined and sent to said selected answering point.

Preferably the switching centre comprises means for identifying events during the call establishment.

Preferably said identifying means is arranged to identify the event when the first estimated position has been determined, and when said event is identified said call establishment is interrupted and said control point is triggered.

Preferably the at least two answering points are emergency call processing centres.

Preferably the control point is a GSM service control point.

Preferably the network further comprising a gateway location centre for providing an interface between said network and said at least two answering points.

Preferably the control point comprises a coordinate routing database for mapping a geographical position of said first position estimate to said selected answering point.

Preferably the location centre is located within said base controller. Alternatively, the location centre may be located separate from said base controller.

BRIEF DESCRIPTION OF DRAWINGS

For a better understanding of the present invention and to show how the same may be carried into effect, reference will now be made by way of example to the accompanying drawings in which.

DESCRIPTION OF PREFERRED EMBODIMENTS OF THE INVENTION

Figure 1:
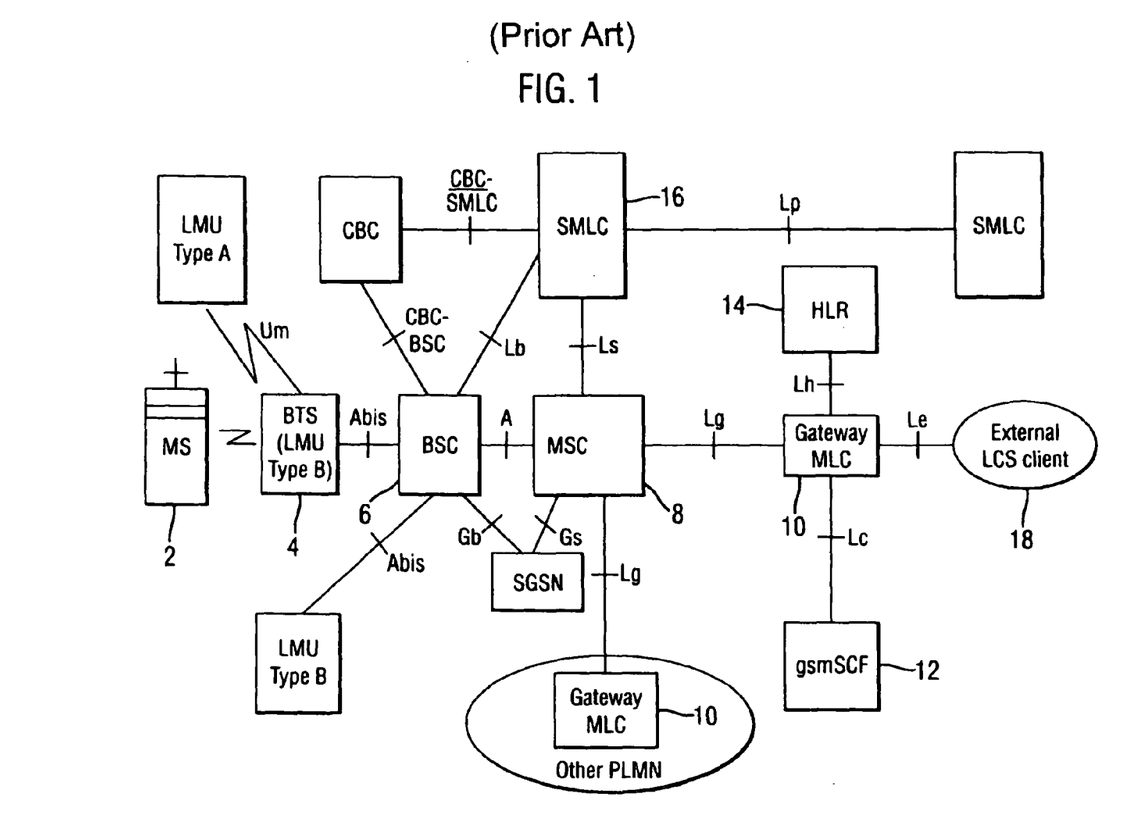
FIG. 1 shows the generic LCS logical architecture.

FIG. 1 shows the generic LCS (Location Services) logical architecture as specified in the 3GPP TS 03.71 Release 99 specification for the Functional Descriptions of Location Services.

An MS 2 is shown connected to a BTS 4 having a particular cell coverage dependant on the transmission power of the BTS 4. The BTS 4 may include a LMU Type B, as depicted. Also as depicted, the BTS 4 may be in communication with a LMU type A. The BTS 4 can have the LMU functionality in the BTS itself or separate. The BTS 4 is connected to a BSC 6 (Base Station Controller), which typically controls a plurality of BTSs each having their own cell coverage. The BSC 6 can be connected to an SMLC 16 (Serving Mobile Location Centre) or to an MSC 8. As depicted, the BSC 6 may be in communication with a LMU Type B. The MSC 8 typically controls a plurality of BSCs and has a VLR (Visitor Location Register), which maintains a database of the details of the MS when entering into a visited network.

The SMLC resides either at the core network level or the radio level and has the functionality for receiving locations measurement signals from the MS 2, and the SMLC is able to compute the final geographical location estimate and the accuracy of the MS 2 within a particular cell. The SMLC 16 may be a standalone unit and connected to the BSC 6 in a BSS (Base Station Subsystem) based SMLC, or to the MSC 8 in a NSS (Network Service Subsystem) based SMLC. Alternatively, the SMLC may be part of another network entity, e.g. the BSC.

The MSC 8 is also connected to a GMLC 10. Using information that it stores or has access to the Gateway Mobile Location Centre (GMLC) authenticates the LCS client 18 that is requesting the position of a subscriber of the system. The GMLC 10 can identify the subscriber by an identifier that specifies the subscriber or the hardware he is using to access the system (e.g. Mobile Subscriber Integrated Services Digital Network Number (MSISDN) or IMSI codes). Using such an identifier it can query the HLR 14 (Home Location Register) to determine in which MSCs (or equivalent's) coverage area the subscriber is located. Such a query will yield the address of the MSC or the address of an equivalent device such as an Serving General Packet Radio Service Support Node (SGSN). The HLR is aware of the current (for instance) MSC and VLR from previous location update procedures. When a location request is received by the MSC the MSC will check for any subscriber-specific LCS privacy restrictions that might be in place, and if the request is not barred by such restrictions it proceeds with the positioning request towards the radio network or SMLC.

The GMLC 10 can also be connected to a gsm(SCF) 12 (GSM Service Control Function) block, which will be described in more detail later.

In any event, it should be appreciated that the functionality shown in FIG. 1 is moveable, so that although the external client is responsible for initiating the position location request, according to a preferred embodiment of the present application, the functionality of the external client 18 can be thought of as moving into the MSC 8. Therefore, the MSC initiates the location request.

The MSC 8 sends the location request to the relevant BSC 6. In a preferred embodiment, the functionality of the SMLC 16 resides with the BSC, and therefore the geographical position of MS 2 can be computed within the radio network using any of the known positioning methods, for example TDOA. Once the geographical location has been calculated it is returned via the MSC 8 to the GLMC 10. One skilled in the relevant art will appreciate that the interfaces and/or connections presented by FIG. 1 and the descriptions presented herein, may be described in accordance with Um, Abis, Gb, A, Lb, CBC-BSC, CBC-SMLC, Gs, Ls, Lg, Lp, Lh, Lc, and Le.

Figure 2:
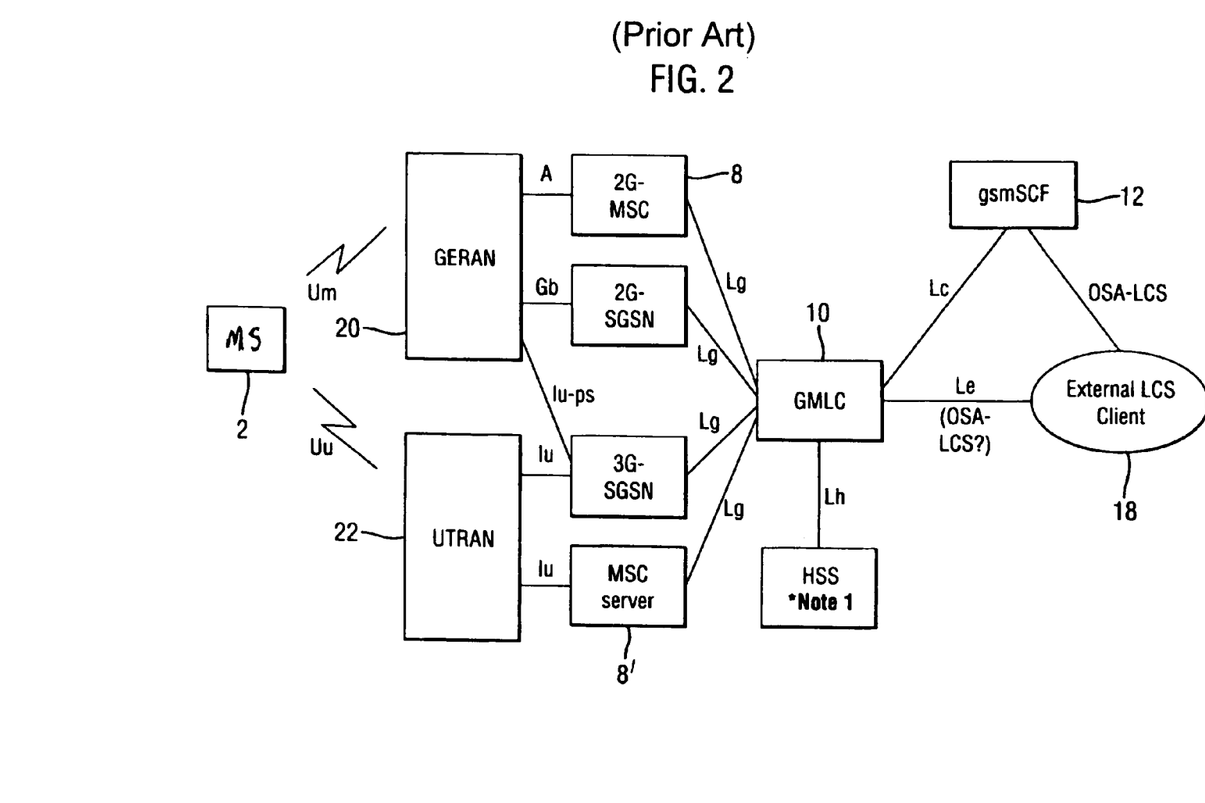
FIG. 2 shows the system level of the LCS arrangement for GSM and UMTS radio access networks.

FIG. 2 shows a system level of the LCS arrangement for GSM and UMTS radio access networks as specified in the 3GPP TS 23.271 Release 4 specification for the UMTS (Universal Mobile Telecommunications system) Functional Descriptions of Location Services. This diagram shows that the standard has evolved to take into account 3G (Third Generation) UMTS networks, which communicate over a UTRAN 22 (UMTS Radio Access Network) with the core network, as well as reinforcing the fact that legacy 2G (second Generation) GSM networks communicate over the GERAN (GSM/EDGE Radio Access Network). Therefore, depending on the radio network, the functionality of the SMLC as referred to in relation to FIG. 1 can reside in either the GERAN 20 or the UTRAN 22. Most of the core functionality is the same, wherein the same reference numerals refer to the same functionality as described in FIG. 1, for example, the GMLC 10, the external LCS client 18, the gsmSCF, etc.

Figure 3:
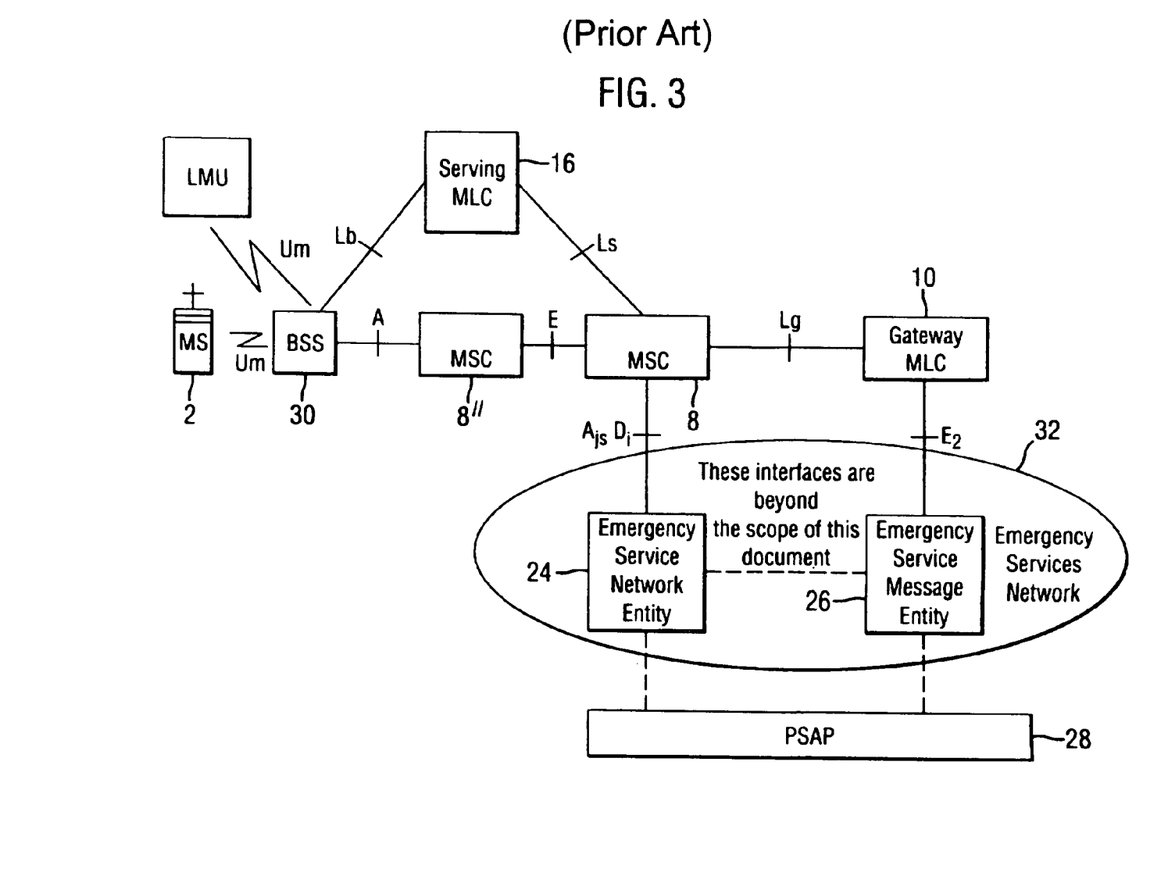
FIG. 3 shows a network reference model for supporting emergency services.

In an embodiment of the present invention, the service which is requesting the positioning information is an emergency service. FIG. 3 shows an example of a network reference model for supporting emergency services as specified in the TIA/EIA/J-STD-036-A document. The BSS (Base Station subsystem) 30 should be understood to refer to the radio network comprising the BSCs 6 and BTSs 4. The MS can be connected to a visited Public Land Mobile Network (PLMN) network controlled by a visited MSC 8, which in turn is connected to a GMLC 10 and through an emergency services network 32 to a PSAP point 28. The MSC 8 may be described as a visited MSC and the MSC 8" may be described as a serving MSC.

The emergency services network 32 comprises an ESNE 24 (Emergency Service Network Entity) and an ESME 26 (Emergency Service Message Entity). At this point, it will be useful to understand the difference between CAS (Call Associated Signalling) and NCAS (Non-Call Associated signalling), which are both techniques for passing location information between the wireless network and the PSAP. In CAS signalling, information is passed within the same messages used to setup and control an emergency call, whereas for NCAS signalling the messages containing location information are passed separate from the call itself.

Broadly speaking, the ESME routes and processes the out-of band messages relating to emergency calls and for NCAS this can be thought of as dealing with the messages containing the location information, whereas the ESNE routes and processes the voice band portion of the call and for NCAS can be thought of as dealing with the call itself.

The location information can be used for two purposes. Firstly to route the call to the appropriate PSAP and secondly used by the operator of the emergency service to locate the caller geographically and dispatch the relevant emergency services. For example, the position information typically contains a given latitude and longitude, which can be translated using a database into the nearest known street address or used to plot the position of the MS on a map with other information like building names, business names, landmarks, etc.

The Base Station Subsystem (BSS) 30 receives the emergency call from the MS and notifies the Visiting Mobile Switching Center (VMSC) 8. To achieve this, the MS first establishes a radio interface connection with the BSC. Then the MS sends a connection management service request to the BSC, which forwards that to the MSC. At this point an A-interface connection is created between the BSC and the MSC. After that the MS sends a call setup request to the MSC, which is relayed transparently through the BSC. The BSS is also involved in the handling of certain positioning procedures. As a generic handling procedure, the BSS is equipped to collect/determine timing advance (TA) information for communications between the MS and it and neighbouring cells, together with receive signal strength levels for such communications. The BSS may determine the location of the MS based on this location. Alternatively, the BSS may transmit TA information for it and neighbour cells, or just for its cell to another entity that can then determine the location. For example, the TA information could be sent to the SMLC to assist in obtaining a position estimate. Specific BSS functionality in positioning procedures is specified in 3GPP TS 03.71 or 3GPP TS 43.059.

The CI (Cell Identifier) method is able to identify the coordinates of the radio coverage area cell of the serving BTS, and that the coverage area of the cell is divided into sectors so that this method can identify which sector of the cell the MS is located.

The CI+TA (Timing Advance) method is slightly more accurate in that the location of the MS within the cell can be even more accurately estimated using TA signals sent between the MS and the BTS, in which the network is able to estimate the distance between the MS from the BTS by calculating the time it takes for signals transmitted from the MS to arrive at the BTS and/or vice versa.

Other methods for example, include the CI+TA+Rx (Receiver) positioning method where, in addition to having the cell/sector identifier (and the coordinates of the cell) and the timing advance information, a received signal level is used to locate the MS. That is, the MS also monitors the power of the signals received from neighbouring BTSs (i.e. each providing their own cell coverage). It follows that the geographical position can be more accurately determined using a line of sight principle so that the MS will be closest to the neighbouring BTS whose signals, received by the MS, are the strongest.

The GMLC 10 also handles requests for the MS from the ESME such as the updated (current) or last known position. The GMLC stores the initial position estimate to support NCAS signalling. One Skilled in the art will appreciate that the interfaces and/or connections presented by FIG. 3 and the descriptions presented herein. may be described in terms of Um, Lb, A. E, Ls, $A_{js}$, $D_j$, Lg, and $E_2$.

Figure 4:
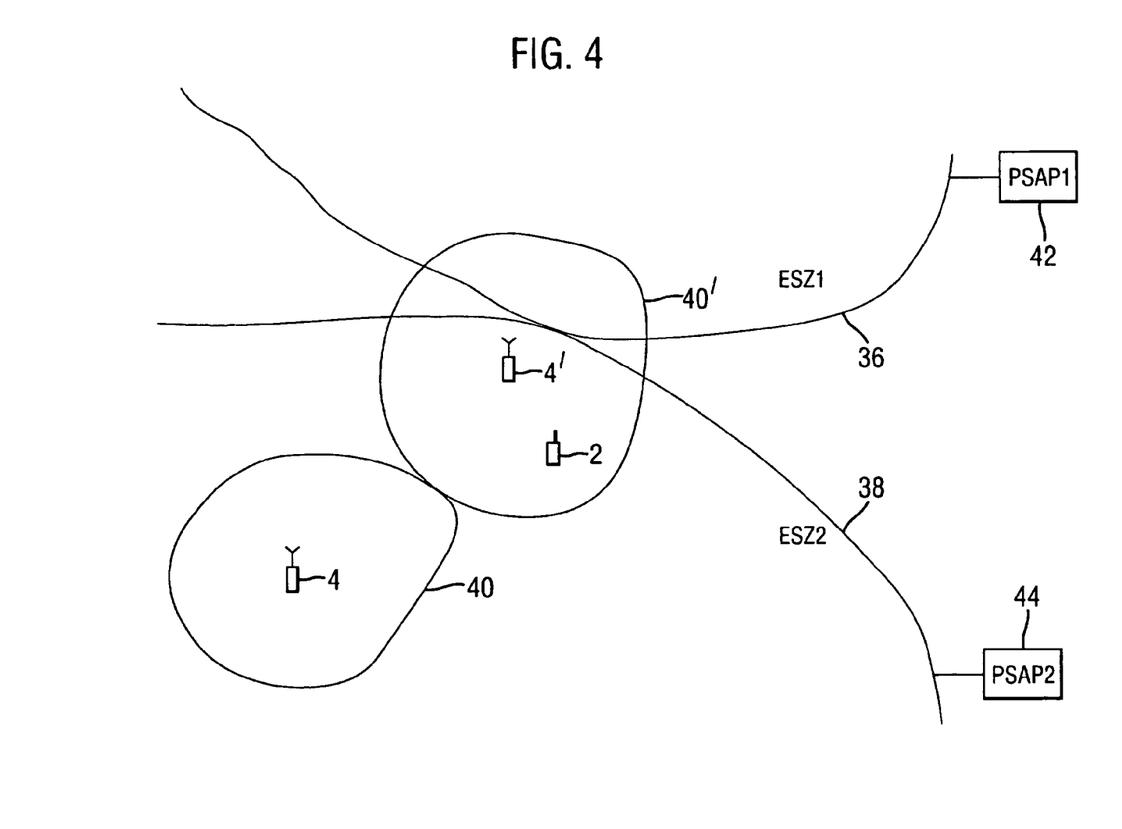
FIG. 4 shows overlapping PSAP regions and radio cell coverage according to an embodiment of the present invention.

FIG. 4 shows an example of PSAP coverage having different ESZs (Emergency Service Zones). Two BTS elements 4 and 4' are indicated, each having their own radio cell coverage 40 and 40' respectively. Also, two arcs 36 and 28 represent the coverage zone of a first PSAP 42 and a second PSAP 44 respectively.

It must be noted that FIG. 4 is a conceptual diagram and the arcs shown by the lines 36 and 38 representing the emergency zones are not radio coverage areas. Instead these arcs 36, 38 represent different geographical areas, each of which is covered by particular PSAP. That is, arc 36 is the geographical border of the ESZ controlled by PSAP1 42 and arc 38 is the geographical border of the ESZ controlled by PSAP2 44. However, if the radio cell coverage crosses geographical borders defined for each PSAP, then more than one PSAP covers a particular cell.

An embodiment of the present invention optimises the routing of the emergency services call to the relevant PSAP. To do this, it is necessary to obtain a more accurate position estimation of the MS 2 within the cell 40'. If an estimate of the position of the MS 2 within the cell is provided, then it is possible to determine that PSAP 2 is where the call should be routed to since this lies within ESZ2.

Figure 5:
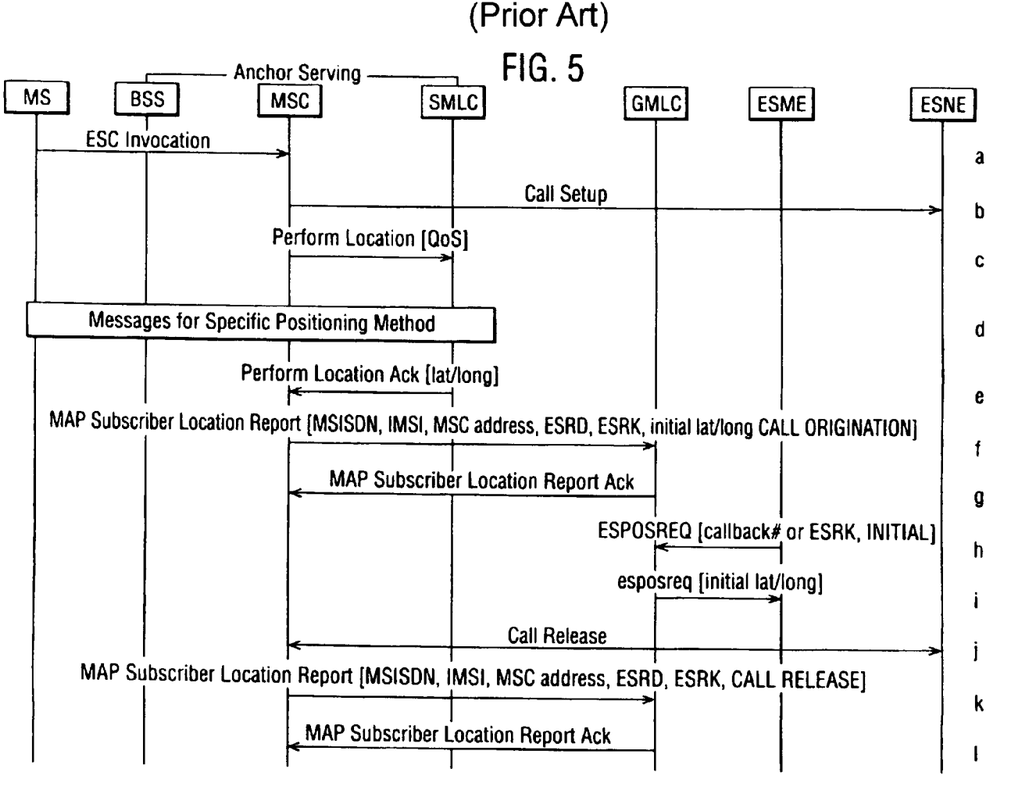
FIG. 5 shows a flow-chart of a known NCAS method of using the initial position for routing and processing the call.

The TIA/EIA/J-STD-036-A standard is concerned with determining an "initial position" estimate of the MS and using this information for both processing the call and routing it to a PSAP based on this initial position. At present this only applies to the CAS method in GSM. An example of a flow chart showing the process for an NCAS case is shown in FIG. 5.

The messages referred to with the numerals (a) through (l) refer to the different messages and will now be described. At step (a) the MS invokes an emergency services call. This triggers determination of the initial position of the MS by the sending of a Perform Location message to the SMLC in step (c). At step (b) the "Call Setup" message extends the call to the ESNE for processing the call by the emergency service. At step (c) a "perform location [QoS]" message is sent from the MSC to the SMLC, requesting the computation of the initial position within a particular accuracy range given by the QoS (Quality of Supply) requirement. If the SMLC resides in the BSS then the MSC would send this message to the BSC, which would send it further to the SMLC. At step (d) messages for specific positioning methods in the radio network are exchanged, for example TDOA, after which time the initial position is estimated and returned by the SMLC to the MSC at step (e). At step (f) the initial position is sent from the MSC to the GMLC and acknowledged at step (g). At step (h), the ESME requests the initial position of the MS stored in the GLMC and this is supplied to the ESME at step (i). At step (j), the emergency call is released, which frees up a significant amount of dynamic information that is typically setup for each emergency call. This frees the valuable resources of the emergency services network associated with a particular PSAP to deal with other calls. At steps (k) and (l) any information relating to the call including the initial position is released from the storage of the GMLC.

One disadvantage of this method is that the call must be extended to the ESNE before the geographical location is known to any better accuracy than the simply which cell the MS is in. If initial position were to be used for routing purposes then the Call Setup message (step (b)) should be delayed until the MSC has received a response to the positioning request (step (e)). The positioning methods used in determining an initial position need to be very accurate in order to satisfy the strict FCC requirements. However, another requirement is that the emergency call should be routed to the relevant PSAP as soon as possible.

Therefore, an embodiment of the present invention makes a distinction between a position estimate made for routing purposes, which will be referred to herein as the "interim position", and the more accurate "initial position" used to indicate the location of the MS for the FCC requirements. The interim position is still a far more accurate estimate of the position of the MS as compared to the cell-level positioning methods of the prior art, but is slightly less accurate than the initial position. The benefit achieved by using a slightly less accurate positioning method in estimating the interim position is that the relevant PSAP can be selected more quickly, which optimises the system as a whole particularly when there is more than one PSAP covering a cell. The interim position can be determined by a method not requiring time consuming measurement procedures. An example of a method to be used for determining the interim position is CI+TA (Cell Identity with Timing Advance).

Figure 6:
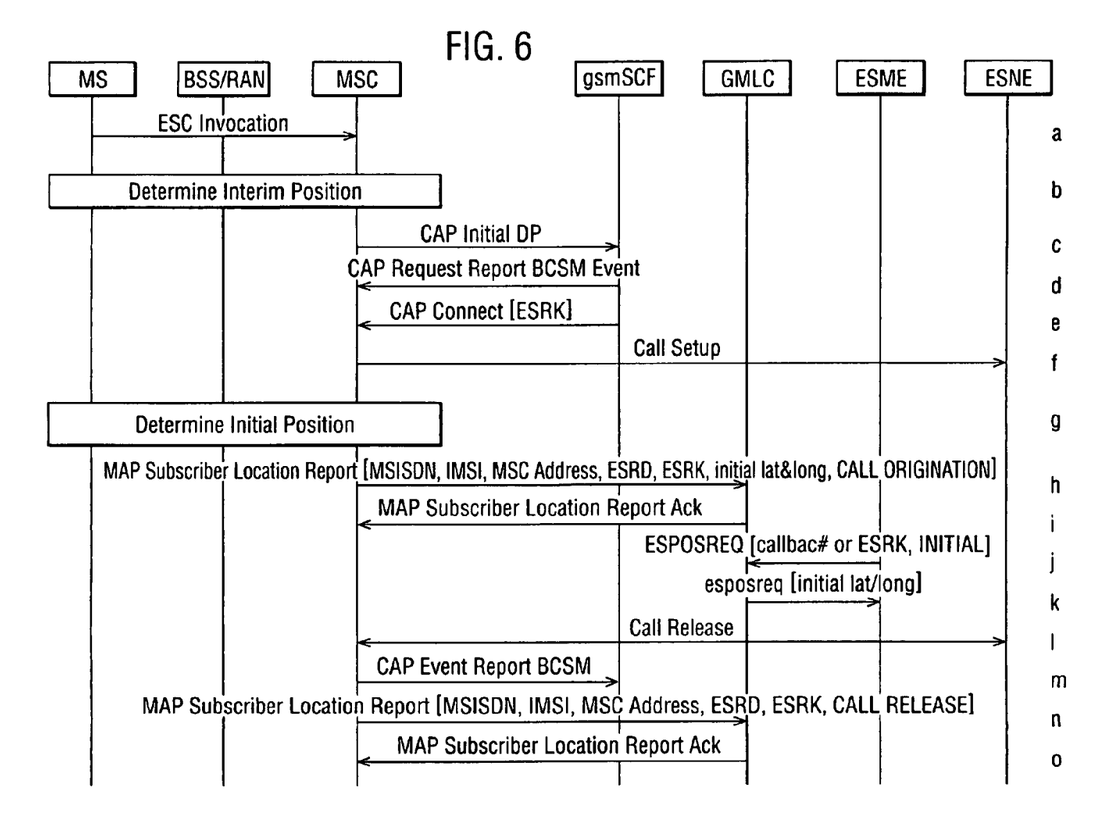
FIG. 6 shows a flow chart of an alternative embodiment of the present invention.
Figure 7:
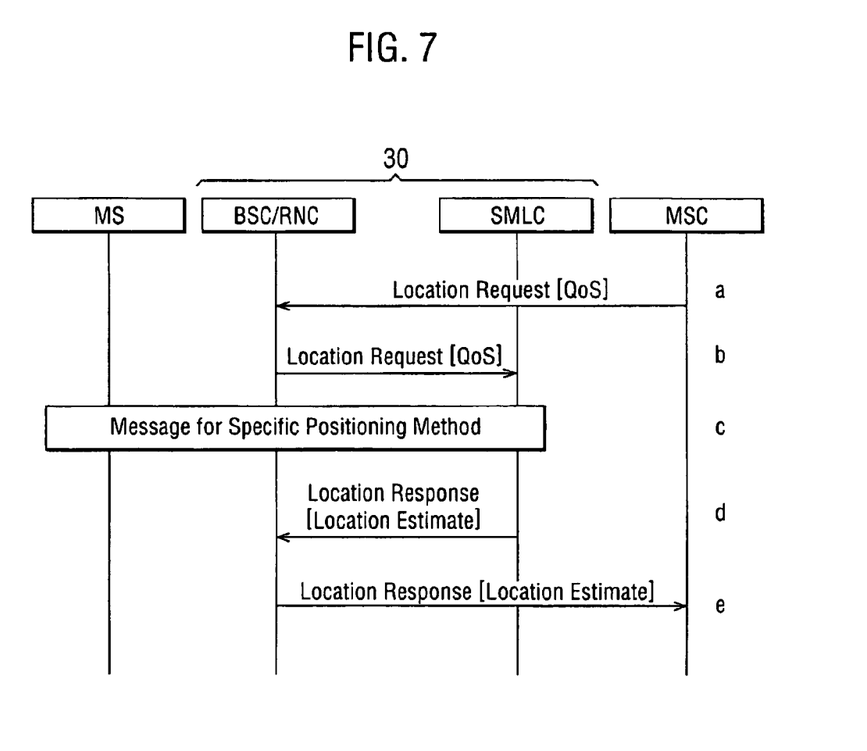
FIG. 7 shows a flow chart describing in more detail some of the steps of FIG. 6.

An embodiment of the present invention is shown in FIG. 6. In this embodiment, the interim position as a geographical location is determined (step b) before the initial position as a geographical location is determined (step g). FIG. 7 is a flow chart illustrating a generic procedure to determine location estimate as a geographical location, being it either interim or initial position of the caller.

If the emergency call should be routed based on geographical position, then the interim position of the calling mobile station is determined. The required accuracy for the interim position represents the accuracy that is sufficient for call routing to the relevant PSAP. That is, the interim location is a more accurate position estimate of the MS as compared to the less accurate method of using the base station's location of the serving cell. This procedure is now described in more detail FIG. 7.

FIG. 7 shows that at step (a) the MSC sends a request to determine the MS's geographical location to the BSC in GSM or RNC (Radio Network controller) in UMTS. The request includes the requested QoS for positioning, i.e. the accuracy expected by the MSC. The request may also carry other information such as the Location Services client type (e.g. emergency services client type). In GSM this message is the "BSSMAP Perform Location Request" as described in the 3GPP TS 08.08/48.008 standard. In UMTS the corresponding message is "RANAP Location Reporting Control" as described in 3GPP TS 25.413.

At step (b) the BSC (or RNC) forwards the request to the SMLC, which is responsible for actually calculating the interim position. As described before, in GSM the SMLC functional entity may be part of the BSC, or a standalone network element. In the latter case the messages used are "BSSMAP-LE Perform Location Requests" as described in 3GPP TS 09.31/49.031. In 3GPP releases 98, and 99 the SMLC may be located in the core network (or network subsystem, NSS), in which case the MSC sends location requests using the BSSMAP-LE protocol (3GPP TS 09.31/49.031) directly to the SMLC. However, in 3GPP Rel-4 and later releases the SMLC always resides in the radio network, BSS or GERAN.

In UMTS, the SMLC functional entity is part of the RNC in 3GPP Rel-4, thus this message is within the RNC's internal communication. From 3GPP Rel-5 onwards the SMLC may also be a standalone element within the UTRAN.

At step (c) the messages for individual positioning methods are transferred, if the used method requires some information or measurement results from the MS or the radio network controller. For GSM system these are described in 3GPP TS 03.71 (3GPP R98 and R99) or 3GPP TS 43.059 (3GPP Rel-4 and later). For UMTS system these are described in 3GPP TS 25.305. It should be noted that after receiving the location request the SMLC may already have information necessary for determining position, e.g. current cell identity and timing advance, without any further message exchange required with other entities.

At step (d) the SMLC returns the location estimate to the BSC (or RNC).

In GSM if the SMLC is a standalone network element, the message is a "BSSMAP-LE Perform Location Response". In 3GPP releases 98 and 99 if the SMLC is located in the core network the SMLC sends this location response message directly to the MSC.

In UMTS the SMLC functional entity is part of the RNC, thus this message is communicated internally within the RNC.

At step (e) the BSC (or RNC) returns the interim position estimate to the MSC. In GSM this message is a "BSSMAP Perform Location Response". In UMTS the corresponding message is a "RANAP Location Report".

In an alternative embodiment of the present application the SMLC is used to determine an "interim position" before the "initial position" is determined. The interim position is determined using a shortened and less accurate procedure than is used for determining the initial position.

The gsmSCF represents functionality which is able to perform control algorithms if a certain event in the BCSM (Basic Call State Model) is triggered. In particular, the MSC is imbued with SSF (Service Switching Function) functionality for communicating with the gsmSCF. The SSF and gsmSCF are well known functional entities defined in the CAMEL (Customized Applications for Mobile Network Enhanced Logic) standards.

This embodiment comprises the following steps (a) to (o) as described in FIG. 6.

(a). The MS invokes an emergency services call.

(b). If the emergency call should be routed based on geographical position, then the MSC initiates determination of interim position using signal flow presented in FIG. 7. The requested QoS is the accuracy requirement for the interim location that is used for routing the emergency call. In order to fulfill time constraints for determining interim position the SMLC may use for example CI+TA positioning method or similar.

(c). According to an embodiment of the present invention, if the emergency call should be routed based on geographical position, then the MSC contains SSF (Service Switching Functionality) which contains DP's (Detection Points) identifying various events of the call processing within the MSC. In particular, when the interim position has been determined the detection point "Collected_Info", which is described in 3GPP TS 23.078, is triggered. When the detection point is triggered, the MSC sends a CAP (CAMEL Application Part) message to the gsmSCF indicating that the interim position has been estimated and what that estimate is. In particular, the "CAP Initial DP message" comprises for example, Called Party Number, Calling Party Number, IMSI (International Mobile Subscriber Identity), Geographical Information and Location Number.

Therefore, the Geographical Information will contain the interim position received by the MSC at step (b). The gsmSCF may assign a new routing number based on the Geographical Information.

(d). The gsmSCF may establish a monitoring relationship by arming one or more detection points. This may be needed in order to receive notification at release of the emergency call. Thus, the gsmSCF 12 can request that when certain events are encountered during call processing of the SSF in the MSC 8, that these events are notified to the gsmSCF. For example, the "CAP Request Report BCSM event" can arm a detection point in the BCSM (Basic Call State Model) of the SSF in MSC 8 to notify the gsmSCF when the call is released (see step 1 below). In this way, when notification of emergence call release is received, valuable resources of the SCP (e.g. a unique ESRK value reserved for the call) can be freed.

(e). The gsmSCF requests the MSC to continue call processing with modified information. That is, the geographical position containing the interim position can be translated from a latitude/longitude co-ordinate to a new destination address, to determine which PSAP to route the emergency call to. In one embodiment of the present invention, the translation can be performed by a CRDB (Coordinate Routing Database). In this way the gsmSCF can supply a new routing destination for the call, wherein the "CAP Connect" message can identify the relevant PSAP with new destination routing address, which is for example an ESRK (Emergency Services Routing Key) allocated to the emergency call as shown, or alternatively ESRD (Emergency Services Routing Digits) that identifies a base station, cell site or sector.

(f). The MSC extends the call to the ESNE associated with the PSAP identified by the interim position of the MS. The call setup should include at a minimum either a callback number (dialable or non-dialable) plus the ESRD or ESRK.

(g). The MSC sends a request to perform initial location determination using a requested $QoS_2$. $QoS_2$ is in line with the FCC regulations and therefore is more accurate than $QoS_1$. The requested $QoS_2$ is the accuracy requirement for the initial position that is reported to the GMLC to determine more accurately the position of the MS. Messages for initial positioning methods are transferred as for the known methods as described in 3GPP TS 43.059, for example E-OTD. Therefore the initial position method of steps (h-o) proceeds as before (see FIG. 7).

It should be noted however, that at point (m), a call release event of the BCSM in the SSF/MSC is encountered, which was armed earlier at step (d). Therefore, the gsmSCF is informed that the call is released and the gsmSCF 12 is then able to free up resources related to the emergency call.

The embodiments of the present invention firstly determine the interim position at emergency call setup and then interrupt call establishment at the MSC by sending the interim position to an SCP (Service Control Point), which is the more generic term for the gsmSCF 12 functionality. The SCP then determines the routing address of the relevant PSAP based on the interim position. The SCP supplies the routing address to MSC, which routes the call to the PSAP. Finally, the initial position which satisfies the FCC requirements is determined as before and sent via the GMLC to the PSAP so that a more accurate location of the caller may be dispatched by the emergency services network.

Therefore, the gsmSCF is used to control the routing of the emergency call to the relevant PSAP based on an interim position estimate. The gsmSCF allows the described embodiments to decouple the routing of the call from the GMLC and therefore the GMLC does not need to be re-designed.

It needs to be appreciated that the described embodiments are particularly useful in that they have minimal impact on existing network entities. The described embodiments use standardised interfaces and routing is based on an interim position performed using the control functionality afforded by the gsmSCF, which is an existing entity in 3GPP network architecture. That is, the CAMEL framework provides a standardised interface and protocol for establishing control relationships between the MSC/SSF and the gsmSCF.

It should be appreciated that the visited network is able to perform call routing for at least the circuit-switched domain of GSM and UMTS. Even if the subscriber has some CAMEL services, it is preferred that triggering for emergency calls is based on information about the currently visited network of the subscriber. This may call for a modification of the CAMEL specification. Such information about the currently visited network could be, for example, an indication that in the visited network the emergency call should be routed based on interim position. Thus, routing of an emergency can be done by the visited network even if the CAMEL SCP is used to control the routing.

It should also be appreciated that the present invention is primarily intended for use in GSM or WCDMA techniques, but is not necessarily limited to these networks.

The invention claimed is:

1. A method, comprising:
  establishing an emergency call between a user's mobile equipment located within a radio coverage area of a serving cell and one of at least two answering points that are associated with the serving cell for emergency call handling, wherein the at least two answering points each have a service zone within the radio coverage area and the user's mobile equipment is located in only one of the two answering points' service zones, the establishing comprising:
  receiving an emergency call request;
  sending a request to a location positioning system, wherein the request indicates a first requested level of accuracy for position information of the user's mobile equipment that is sufficient to specify a particular answering point of the at least two answering points in which the user's mobile equipment is located;
  determining a first estimate of a position of the user's mobile equipment within the radio coverage area based on the first requested level of accuracy;
  delaying the call establishment of the emergency call;
  upon receiving the first estimate at a control point, translating the position in the first estimate to a destination address, wherein the destination address specifies the particular answering point;
  selecting the particular answering point as a destination for the emergency call;
  extending the call establishment, which was delayed, to the selected answering point to resume emergency call establishment handling, wherein the emergency call is extended after the first estimate is determined;
  querying a second position estimate by sending a second request to the location positioning system, wherein the second request indicates a second requested level of accuracy for position information of the user's mobile equipment and wherein the second requested level of accuracy is greater than the first requested level of accuracy; and
  sending the second position estimate to the selected answering point before releasing the emergency call.

2. The method according to claim 1, wherein non-call associated signalling is used wherein messages used to select the at least one of the two answering points during the emergency call establishment are separate from messages used for the established emergency call.

3. The method according to claim 1, wherein the selecting is done using the control point to translate the first estimate, which is a geographical position, into a routing number of the selected answering point.

4. The method according to claim 1, wherein the first estimate of the position is determined by using an identifier of the radio coverage area and timing advance information.

5. A network, comprising:
  a call establisher system comprising circuitry configured to establish an emergency call between a user's mobile equipment located within a radio coverage area of a serving cell and one of at least two points that are associated with the serving cell for emergency call handling, wherein the at least two answering points each have a service zone within the radio coverage area and the user's mobile equipment is located in only one of the two answering points' service zone and wherein the call establisher system is configured to:
  receive an emergency call request;
  send a request to a location positioning system, wherein the request indicates a first requested level of accuracy for position information of the user's mobile equipment that is sufficient to specify a particular answering point of the at least two answering points in which the user's mobile equipment is located;
  determine a first estimate of a position of the user's mobile equipment within the radio coverage area based on the first requested level of accuracy;
  delaying the call establishment of the emergency call;
  upon receiving the first estimate at a control point, translate the position in the first estimate to a destination address, wherein the destination address specifies the particular answering point;
  select the particular answering point as a destination for the emergency call;
  extend the call establishment, which was delayed, to the selected answering point to resume emergency call establishment handling, wherein the emergency call is extended after the first estimate is determined;
  query a second position estimate by sending a second request to the location positioning system, wherein the second request indicates a second requested level of accuracy for position information of the user's mobile equipment and wherein the second requested level of accuracy is greater than the first requested level of accuracy; and
  send the second position estimate to the selected answering point before releasing the emergency call.

6. A system, comprising:
  a base controller comprising circuitry configured to control a base transceiver that provides a radio coverage area;
  a switching center in communication with the based controller, the switching center configured to receive an emergency call request from the user's mobile equipment and send a request to a location center, wherein the request indicates a first requested level of accuracy for position information of the user's mobile equipment that is sufficient to specify a particular answering point of the at least two answering points in which the user's mobile equipment is located;
  the location center configured to determine a first estimate of the position of the user's mobile equipment within a coverage area based on the first requested level of accuracy; and
  a control point in communication with the location center, the control point configured to:
  delay the call establishment of an emergency call between the user's mobile equipment and one of at least two answering points;
  upon receiving the first estimate, translate the position in the first estimate to a destination address, wherein the destination address specifies the particular answering point;

select the particular answering point as a destination for the emergency call; and extend the call establishment, which was delayed, to the selected answering point to resume emergency call establishment handling, wherein the emergency call is extended after the first estimate is determined, query the location center for a second position estimate by sending a second request to the location center, wherein the second request indicates a second requested level of accuracy for position information of the user's mobile equipment and wherein the second requested level of accuracy is greater than the first requested level of accuracy;

send the second position estimate to the selected answering point before releasing the emergency call.

7. The network according to claim 5, wherein the call establisher system is configured to use non-call associated signalling wherein messages used to select the at least one of the two answering points during the emergency call establishment are separate from messages used for the established emergency call.

8. The network according to claim 5, wherein selection of an answering point comprises use of the control point to translate the first estimate, which is a geographical position, into a routing number of the selected answering point.

9. The network according to claim 5, wherein the first estimate is determined by using an identifier of the radio coverage area and timing advance information.

10. A non-transitory computer-readable medium configured to control a processor to perform operations comprising:

establishing an emergency call between a user's mobile equipment located within a radio coverage area of a serving cell and one of at least two points that are associated with the serving cell for emergency call handling, wherein the at least two answering points each have a service zone within the radio coverage area and the user's mobile equipment is located in only one of the two answering points' zones, the establishing comprising:

receiving an emergency call request;

sending a request to a location positioning system, wherein the request indicates a first requested level of accuracy for position information of the user's mobile equipment that is sufficient to specify a particular answering point of the at least two answering points in which the user's mobile equipment is located;

determining a first estimate of a position of the user's mobile equipment within the radio coverage area based on the first requested level of accuracy;

delaying the call establishment of the emergency call;

upon receiving the first estimate at a control point, translating the position in the first estimate to a destination address, wherein the destination address specifies the particular answering point;

selecting the particular answering point as a destination for the emergency call;

extending the call establishment, which was delayed, to the selected answering point to resume emergency call establishment handling, wherein the emergency call is extended after the first estimate is determined;

querying a second position estimate by sending a second request to the location positioning system, wherein the second request indicates a second requested level of accuracy for position information of the user's mobile equipment and wherein the second requested level of accuracy is greater than the first requested level of accuracy; and sending the second position estimate to the selected answering point before releasing the emergency call.

\* \* \* \* \*